United States Patent [19]

Seki

[11] Patent Number: 4,573,928
[45] Date of Patent: Mar. 4, 1986

[54] TEACHING TOY

[75] Inventor: Yoshizo Seki, Tokyo, Japan

[73] Assignee: Tomy Kogyo Co., Inc., Tokyo, Japan

[21] Appl. No.: 665,101

[22] Filed: Oct. 26, 1984

[51] Int. Cl.⁴ .............................................. G09B 3/02
[52] U.S. Cl. .................................. 434/348; 434/176; 434/232
[58] Field of Search ............... 434/348, 324, 167, 176, 434/227, 228, 232

[56] References Cited

U.S. PATENT DOCUMENTS

| | | | |
|---|---|---|---|
| 2,518,206 | 8/1950 | Vitarelli . | |
| 3,120,708 | 2/1964 | Silber | 434/348 X |
| 3,707,779 | 1/1973 | Yamamoto | 434/324 X |
| 3,739,069 | 6/1973 | Sanomeier | 434/324 |
| 4,182,071 | 1/1980 | Todokoro . | |
| 4,402,158 | 9/1983 | Seki et al. | 446/198 |

Primary Examiner—William H. Grieb
Attorney, Agent, or Firm—K. H. Boswell

[57] ABSTRACT

A teaching toy has a housing with a viewing screen located in the housing. Positioned behind the viewing screen is an indicia carrier located on rollers. A plurality of indicia is located on the surface of the indicia carrier. By rolling the indicia carrier on the rollers, different portions of the indicia located on the indicia carrier are viewable through the viewing screen. Associated with the indicia carrier and located in front of it between it and the screen are a series of cover members which can temporarily cover a part of the indicia which is exposed through the screen. Operator actuators are connected to the cover members so as to allow the cover members to sequentially move from a position wherein they cover the indicia to a position where they no longer cover the indicia. By sequentially utilizing the actuator members, a child utilizing the toy partially uncovers the indicia, allowing the child to guess what the total indicia will be. When all of the cover members have been moved from their covered position to their uncovered position, a further actuator is utilized to move the indicia carrier on the roller to expose new indicia through the screen.

17 Claims, 10 Drawing Figures

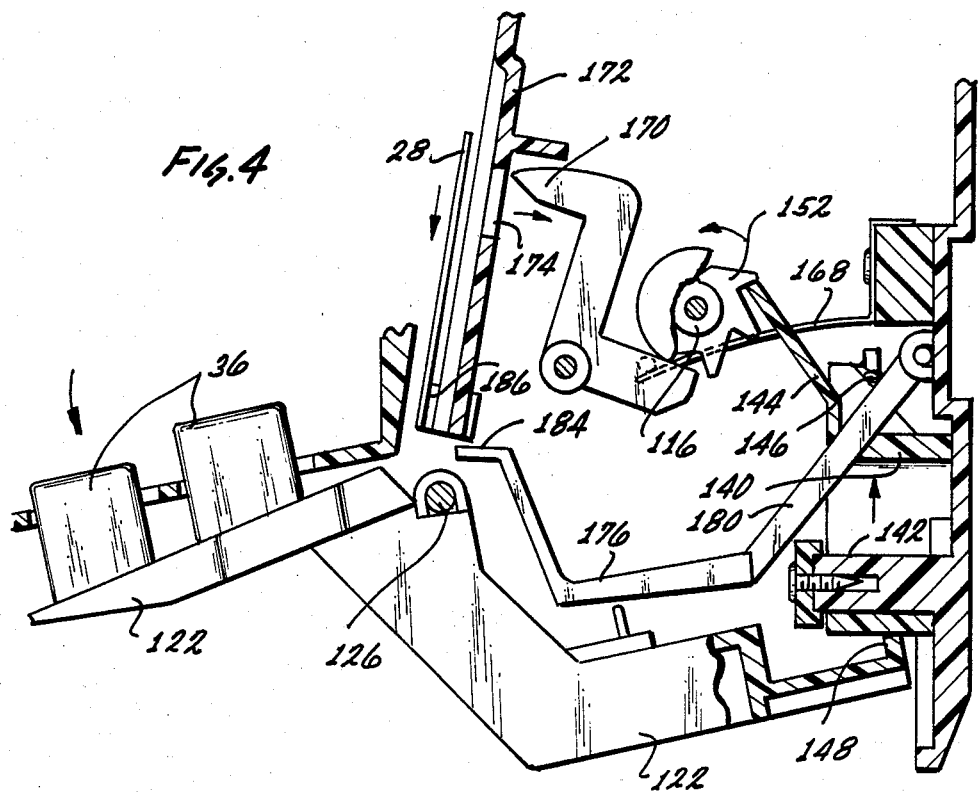
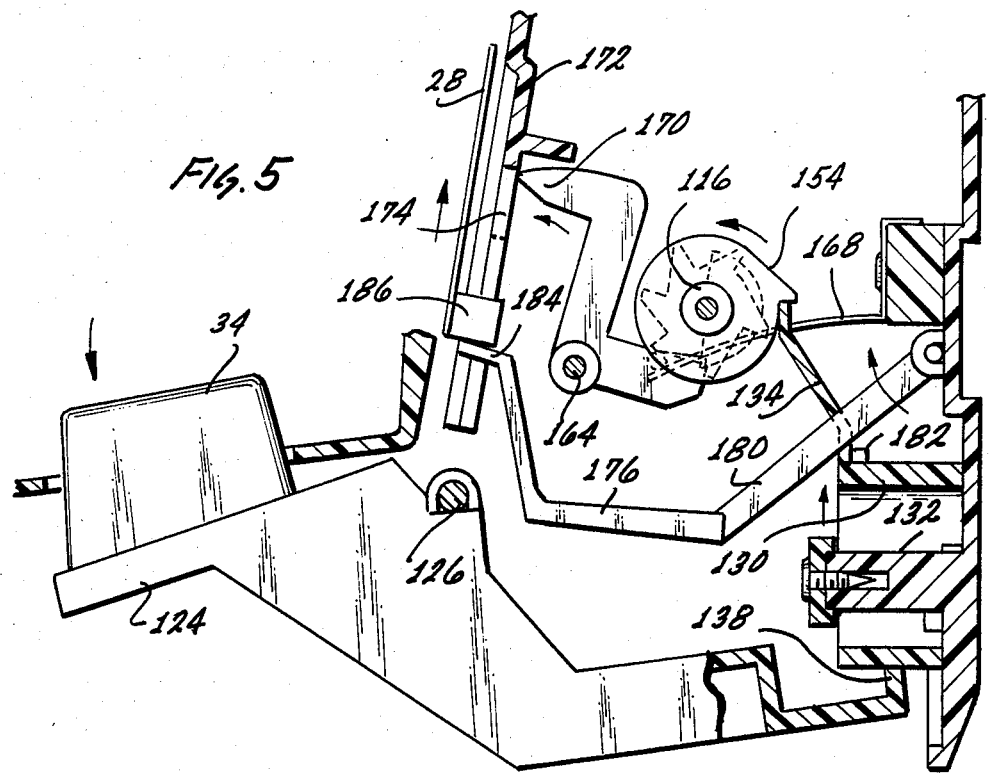

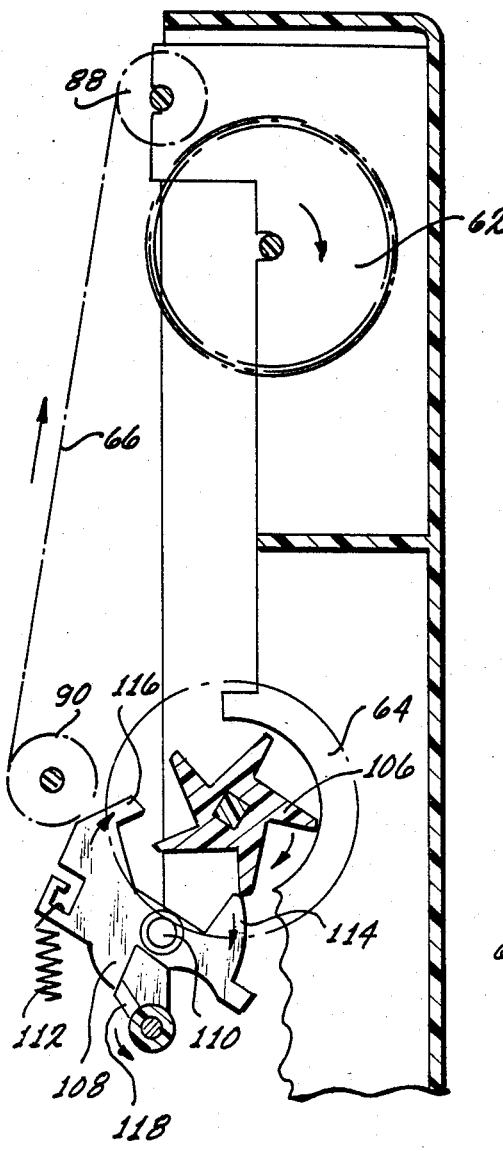
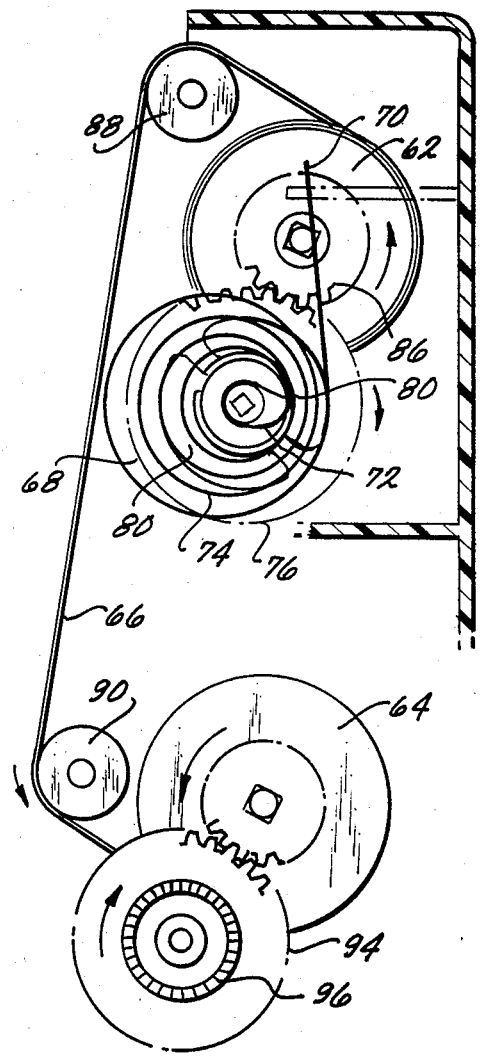
FIG.6
FIG.7

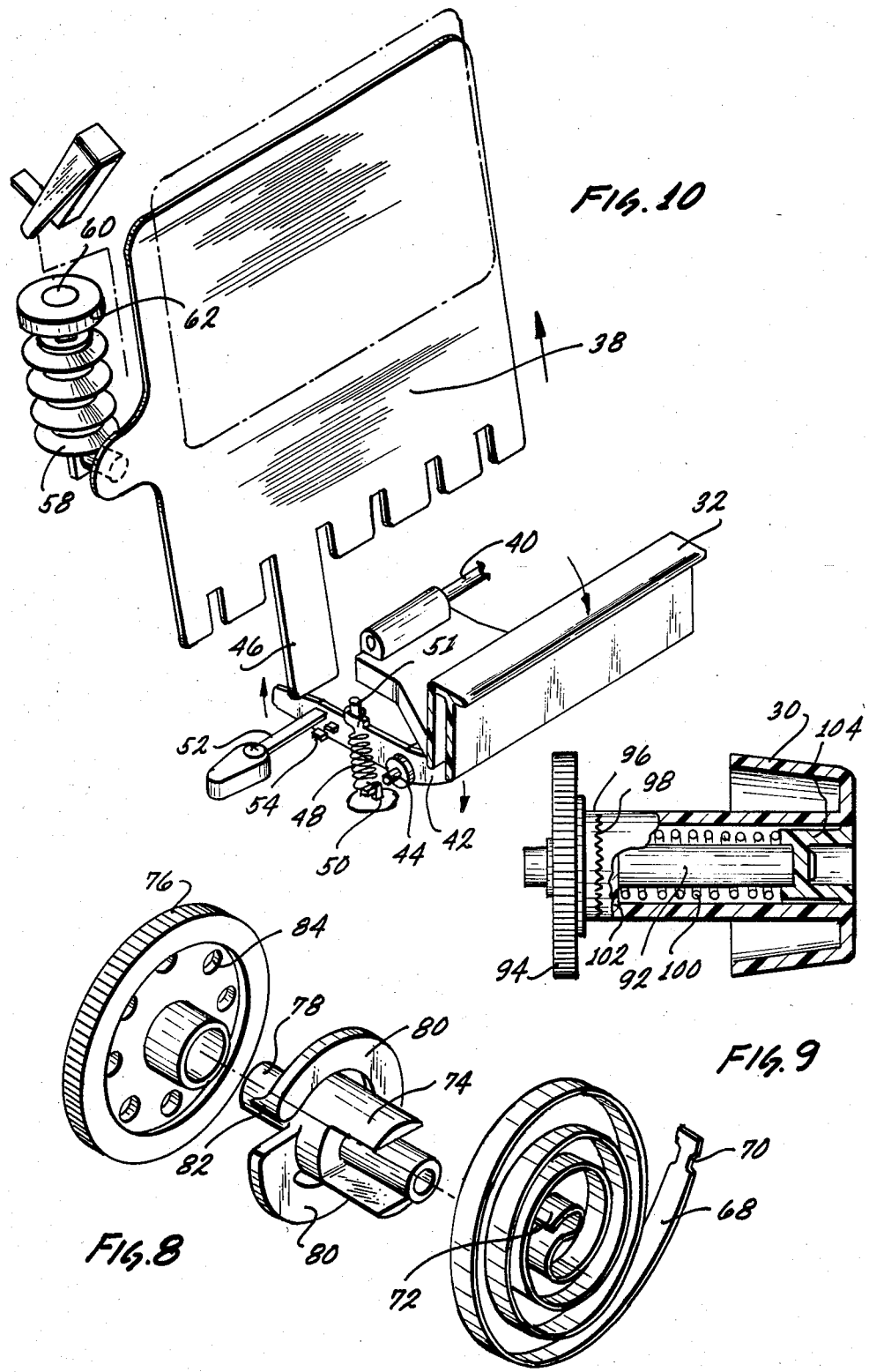

TEACHING TOY

BACKGROUND OF THE INVENTION

This invention is directed to a toy which can be utilized as either a teaching toy or as an entertainment toy. The toy includes an indicia carrier having a plurality of indicia located thereon, and a series of cover members which can sequentially be moved from positions wherein they cover portions of the indicia to positions where they uncover these same portions.

A variety of teaching machines or teaching toys are known which utilize a long strip of paper having questions or other indicia located thereon, which is rolled around rollers and is located within a housing so as to expose only a portion of the paper roller at any one time. Questions and the like can be located on the paper roller with the object of the toy being for the child or other user to correctly guess the answer or otherwise identify the indicia exposed to view. These toys or teaching machines generally have some method for the child to ascertain whether or not a correct guess was made. This includes the flashing of lights on a correct answer, or the appearance of a marble or the like. While these machines certainly are of a utilitarian nature, they generally are of a sophistication level not directed to the preschooler.

With the large scale dissemination and utilization of digital computers, children are being exposed at a very early age to these computers. The computers, however, are even more sophisticated than the above noted teaching machines, and as such, are also unsuitable for use by a small child. Children are capable of extensive learning simply by mimicking older siblings or adults. In view of this, it is considered that there exists a need for a teaching machine which is capable of both giving a small child the impression of operating a computer and at the same time is unsophisticated enough for the small child to be able to operate the teaching machine or teaching toy by himself without adult supervision.

BRIEF DESCRIPTION OF THE INVENTION

In view of the above, it is a broad object of this invention to provide a teaching toy of a level of sophistication capable of being utilized by a preschool age child. It is a further object of this invention to provide a toy which the child can operate without adult supervision in both an educational manner and strictly for entertainment and the like. It is a further object to provide a toy, which because of the simplicity of its engineering principles incorporated therein, is capable of being operated by the child without supervision, yet is of a sophistication level so as to maintain the interest of the child for long periods of time, and provide an educational experience for the child.

These and other objects, as will be evident from the remainder of this specification, are achieved in a toy which comprises: a housing, an indicia carrier means movably located on said housing, said indicia carrier means including indicia located thereon; a viewing means located on said housing in association with said indicia carrier means, said indicia carrier means movable with respect to said viewing means, said viewing means for viewing a first portion of said indicia on said indicia carrier means and in response to movement of said indicia carrier means with respect to said viewing means said viewing means for viewing a further portion of said indicia on said indicia carrier means, an indicia cover means operatively associated with both of said viewing means and said indicia carrier means, said indicia carrier means movable between a covered position and an uncovered position, in said covered position said indicia cover means temporarily covering at least a portion of any of said viewable indicia inhibiting view thereof and in said uncovered position said indicia cover means uncovering said covered indicia allowing viewing thereof, operator interface means operatively associated with both said indicia cover means and said indicia carrier means, said operator interface means operable on by an operator of said toy and in response to operation of said operator interface means said indicia cover means moving from said covered position to said uncovered position followed by said indicia carrier means moving to said further position and said indicia cover means moving to said covered position.

In the illustrative embodiment in the specification, the viewing means includes a viewing screen which is a lenticular screen so as to provide simulated movement of the indicia which is under view. Further in the illustrative embodiment, the indicia cover means includes a plurality of cover members which are movably located on the housing, with each of the cover members covering a portion of the indicia which is viewable through the lenticular screen. The cover members are sequentially movable from the covered position to the uncovered position so as to sequentially uncover greater and greater portions of the indicia viewable through the lenticular screen.

Further in the illustrative embodiment, the indicia carrier means includes an elongated carrier member which is flexible and is rolled on to a roller means located within the housing. By moving different portions of this flexible member past the viewing means, different portions of the indicia located on the flexible member are exposed through the viewing means. In the illustrative embodiment, the operator interface means includes at least two operator actuators, independently operable by the operator of the toy. A first of these actuators is associated with the indicia cover means so as to move the cover members from a covered to an uncovered position with respect to the indicia on the flexible member. A second of these actuators is associated with the indicia carrier means so as to roll the flexible elongated member on the roller means to expose fresh portions of the indicia located on the flexible elongated member.

In the illustrative embodiment, a control means is interspaced between the operator interface means and the indicia cover means and indicia carrier means. In the illustrative embodiment, the control means comprises a control member which is rotatably mounted within the housing, and includes a plurality of control surfaces located thereon. The individual operator actuator members interact with certain of the control surfaces with the indicia carrier means and indicia cover means interacting with other of tHe control surfaces.

BRIEF DESCRIPTION OF THE DRAWINGS

This invention will be better understood when taken in conjunction with the drawings wherein:

FIG. 3 is a fragmentary side elevational view in partial section about the line 3—3 of FIG. 1;

FIG. 4 is a view similar to FIG. 3, except certain of the components are located in a different spatial relationship and other components are cut away;

FIG. 5 is a view similar to FIGS. 3 and 4 taken about the line 5—5 of FIG. 1;

FIG. 6 is a fragmentary side elevational view of certain of the components generally located within the upper left hand portion of FIG. 1;

FIG. 7 is a side elevational view in partial section of certain of the components located in the upper right side of FIG. 1;

FIG. 8 is an exploded isometric view of certain of the components located in the central portion of FIG. 7;

FIG. 9 is an elevational view in partial section of a control knob located on the right hand side of the toy as it is seen in FIG. 1, but not exposed for the purposes of FIG. 1; and FIG. 10 is an exploded isometric view of certain of the components which would be in the front part of the toy as seen in FIG. 1.

Figure 1:
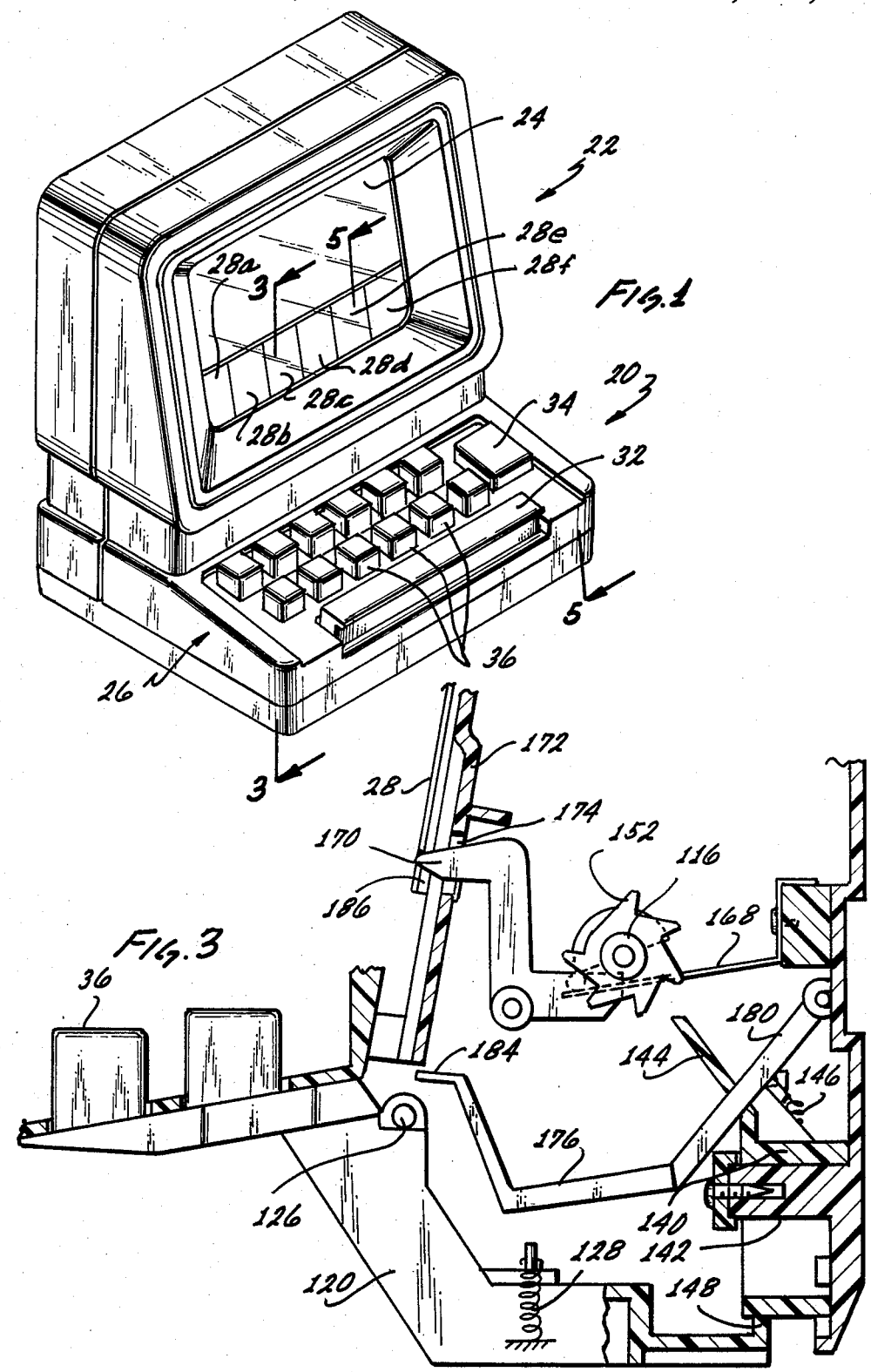
FIG. 1 is an isometric view of the toy of this invention.

The invention illustrated in the drawings and described in the specification utilizes certain principles and/or concepts as are set forth in the claims appended to this specification. Those skilled in the toy arts will realize that these principles and/or concepts are capable of being utilized in a variety of embodiments which may differ from the exact embodiment utilized for illustrative purposes herein. For this reason, this invention is not to be construed as being limited to only the illustrative embodiment, but is to be construed in view of the claims.

DETAILED DESCRIPTION OF THE INVENTION

The toy 20 shown in FIG. 1 is shaped like a miniature computer. It has a housng 22, a screen 24 and keyboard 26 located thereon. Viewable through the screen 24 are a plurality of cover members collectively identified by the numeral 28. Not seen in FIG. 1, but shown in FIG. 9 is a knob 30 which is located on the toy 20 as it is viewed in FIG. 1, on the right hand side of the toy 20, about in line with the lower edge of the screen 24.

The keyboard 26 can generally be divided into three sections. This includes space bar 32, reset button 34 and keys, collectively identified by the numeral 36.

The toy 20 is operated as follows. First the knob 30 is wound to reset an indicia roller which is inside to a starting position. The child utilizing the toy 22 then pushes the reset button 34. This causes the indicia viewable behind the screen 24 to move up approximately one fourth of the way up the screen 24. In doing this, it also sets the cover members 28 in an elevated, or covered position such that they cover approximately the bottom one fourth of the screen 24 and any indicia which is located thereon. The child now can press any one of the keys 36 to cause the left hand most cover member, cover member 28a to descend downwardly. Pressing another of the keys 36 causes the next to the left hand cover member 28b to descend downwardly. With each press of one of the keys 36, the next in line of the cover members 28, in moving from left to right, moves downwardly from a covered to an uncovered position so as to expose any indicia located beneath the particular cover member.

When all of the cover members 28 have been moved from the covered to the uncovered position, the totality of all of the indicia viewable on the screen 24 has been exposed to the view of the child operator. The child now pushes the reset button 34 a further time to cause the indicia to move upwardly about one fourth of the height of the screen and to once again reset the cover members 28 in the covered position. As before, by depressing one of the keys 36, the cover members 28 are sequentially moved from left to right from the covered to the uncovered position.

The indicia which is exposed through the screen 24 is designed so the child can guess the answer to a question such as "What color is this", the next in line of a number, the next in line of the ABC's or the like. As for instance, if a picture of a horse is shown on the portion of the indicia viewable on the screen 24 which is located totally above any of the covered members 28, the word "horse" would be located behind the covered members 28 when they are in the covered position. The child tries to guess what the picture is. If the child needs a clue, the child pushes one of the keys 36, moving the first cover member 28a from its covered to its uncovered position. At this time, the first letter, "H" is uncovered on the bottom part of the screen 24. If this is not a sufficient clue for the child, the child then pushes a further of the keys 36 to cause the cover member 28b to move from the covered to the uncovered position, exposing the letter "O" to give a further clue. The operation of the toy 20 is repeated until all of the covered members 28 are in the uncovered position, and at that time the reset button 34 is pushed down to move the indicia on the screen 24 and to once again set the cover members 28 in the covered position.

At any time the child may push down the space bar 32. When the space bar is pushed down, it sets a certain mechanism as hereinafter described, causing a lenticular screen 38, seen in FIG. 10, to move in front of the screen 24. The indicia which is viewable through the screen 24 is printed in such a manner such that in combination with the movement of the lenticular screen 38, the indicia appears to move on the screen 24, giving the appearance of graphic movement on the screen 24.

Referring now to FIG. 10, the mechanism of action of the lenticular screen 38 under the action of the space bar 32 is shown. The space bar 32 is hinged via an axle 40 to the inside of the housing 22. This allows the space bar 32 to move upwardly and downwardly. Directly underneath the space bar 32 is a lever 42 which is hinged via axle 44 to the inside of the housing 22. The lever 42 is a first class lever, with the space bar 32 pressing on one end and its other end positioned underneath an extension 46 projecting downwardly from the lenticular screen 38. A spring 48 extends between a tab 50 located on the bottom of the inside of the housing 22 and a small peg 51 located on the upper surface of the lever 42. This biases the arm of the lever 42 which contacts the extension 46 of the screen 38 downwardly so as to bias the other end of this lever 42 upwardly to contact the bottom side of the space bar 32 to bias the space bar 32 upwardly.

When the space bar 32 is pressed, it contacts the lever 42, rotating the lever 42 about its axle 44, such that it lifts the lenticular screen 38 upwardly. A small plastic member 52 is attached to the inside of the housing 22 and projects toward the lever 42. The lever 42 includes two small tabs collectively identified by the numeral 54 located on its side, which contact the end of the plastic member 52 as the lever 42 rocks about the axle 44. This produces a clicking sound in association with the movement of the lever 42.

The lenticular screen 38 includes a side extension 56 which is connected to the bottom of a bellows 58. The bellows 58 operates as does the bellows in U.S. Pat. No. 4,402,158. For the purposes of this specification, the entire disclosure of U.S. Pat. No. 4,402,158 is herein incorporated by reference. Briefly, the bellows 58 includes a diaphragm 60 located on its upper surface which sits on top of a roughened surface having a hold in the middle as per the teachings of U.S. Pat. No. 4,402,158. A cap 62 holds the diaphragm 60 on the roughened surface. When bellows 58 is compressed, air is expelled out of the bellows. Air then slowly seeps back into the interior of the bellows 58 allowing the bellows to slowly expand. The end of the bellows 58 near the cap 62 is fixed to the interior of the housing 22. As such, it is immovable. Upon compression of the bellows 58, and slow expansion of the same, the bellows 58 thus pushes downwardly on the extension 56 to slowly move the lenticular screen 38 downwardly. This slow movement of the lenticular screen 38 across the screen 24 results in the simulated action of indicia on the screen 24 as was described above.

Figure 2:
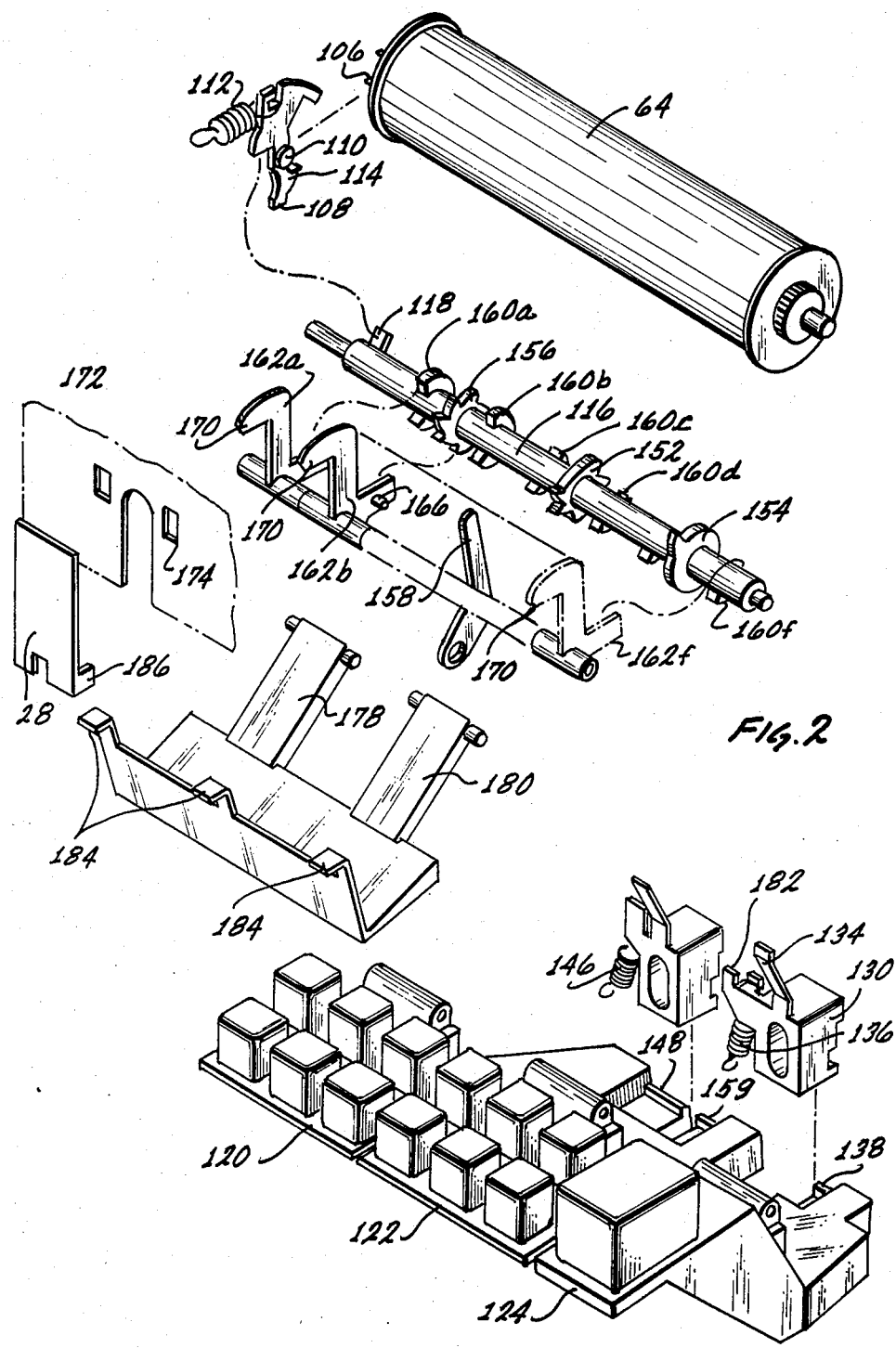
FIG. 2 is an exploded isometric view showing certain of the operating mechanisms of the toy of FIG. 1.

In reference now to FIGS. 2, 6 and 7, appropriately suspended within the housing 22 is an upper roller 62 and a lower roller 64. Extending between the rollers 62 and 64 is a flexible elongated paper roll 66 serving as an indicia carrier. The paper roll 66 is attached at one of its ends to roller 62 and at the other of its ends to roller 64. It is wound onto lower roller 64 by rotation of knob 30 at the start of use of the toy 20. On each press of the reset button 34, a segment of the paper roll 66 moves off of lower roller 64 and a further segment is rolled onto upper roller 62. The area of the paper roll 66 which is located between the two rollers 62 and 64 is exposed through the screen 24. The paper roll 66 includes a plurality of individual indicia printed thereon as was described above.

In reference now to FIGS. 7 and 8, a coil spring 68 is fixed via end 70 to the inside of the housing 22. Its other end, its inside end 72, attaches to a combination winding spindle and clutch member 74. A gear 76 is located about the axle portion 78 of the winding spindle 74. Gear 76 is free to turn on this axle portion 78. The winding spindle 74 includes two spring arms 80, each having a small dog 82 located on their end. The gear 76 includes a plurality of holes collectively identified by the numeral 84 which can be engaged by the dogs 82. If the winding spindle 74 is turned clockwise with respect to the gear 76 and the gear 76 is fixed for any reason, such as all of the paper roll 66 has been wound on the upper roller 62, the spring arms 80 will flex away from the gear 76 allowing the dogs 82 to slip with respect to the holes 84. However, if the winding spindle 74 is biased counterclockwise by the uncoiling action of the coil spring 68, the dogs 82 are fixed within the holes 84 and as such the gear 76 will also rotate counterclockwise in conjunction with the uncoiling of the coil spring 68.

The gear 76 meshes with a gear 86 formed on one of the upper roller 62. This connects the upper roller 62 to the coil spring 68. When the paper roll 66 is wound onto the lower spindle 64 at the start of play of the toy 20, this causes counterclockwise rotation of the upper roller 62 and its associated gear 86. This, in turn, rotates the gear 76 clockwise to coil the coil spring 68. During play of the toy 20, upon each depression of the reset button 34, the bias induced into the coil spring 68 causes counterclockwise rotation of the gear 76, which in turn rotates the gear 86 and the upper roller 62 clockwise, as seen in FIG. 7, to wind the paper roll 66 onto the upper roller 62.

In passing from the upper roller 62 to the lower roller 64, the paper roll 66 passes over two idle rollers, upper idle roller 88 and lower idle roller 90. These idle rollers 88 and 90 position the paper roll 66 directly behind the lenticular screen 38.

Referring now to FIGS. 7 and 9, winding of the paper roll 66 onto the lower roller 64 is shown. The knob 30 slips over a boss 92 which is formed as part of a gear 94. The gear 94 includes a small re-entrant gear 96 on its side. The knob 30 further includes a corresponding re-entrant gear 98 on its inner end. The re-entrant gears 98 and 96 mesh with one another to transfer rotation of the knob 30 to the gear 94. A spring 100 is positioned around the boss 92 and is compressed between the bottom 102 of the knob 30 and a plug 104 which is attached via a screw to the top of the boss 92. The compression spring 100 biases the re-entrant gear 98 into engagement with re-entrant gear 96 to transfer motion of the knob 30 to the gear 94. If the gear 94 however is fixed because all of the paper roll 66 is located on the lower roller and the knob 30 is turned, the re-entrant gear 98 will slip along the re-entrant gear 96 to act as a clutch mechanism to prevent ripping of the paper roll 66 due to overtightening of the knob 30.

The gear 94 meshes with a gear 96 formed on the right hand side of the lower roller 64 to transfer motion from the knob 30 to the lower roller 64 in order to wind the paper roll 66 onto the lower roller 64 and concurrently coil the coil spring 68.

On the other side, the left hand side of the lower roller 64, is a ratchet wheel 106. It is fixed to the lower roller 64 and thus rotates in conjunction with the lower roller 64. A pawl 108 is pivotally attached via its axle 110 to the interior of the housing 22. A small spring 112 attaches between the pawl 108 and the interior of the housing 22. This biases the pawl to rotate counterclockwise as seen in FIG. 6. The pawl 108 interacts with the ratchet wheel 106 to either hold the lower roller 64 fixed or to allow it to move by stepwise rotation. This is accomplished by first locking of the ratchet wheel 106 by the end 114 of the pawl such that the ratchet wheel 106 cannot rotate clockwise. If the pawl 108 is rotated clockwise about its axle 110, the end 114 is moved away from the ratchet wheel 108 allowing the ratchet wheel 106 to turn a slight increment of rotation until the end 116 contacts a further tooth on the ratchet wheel 106. Upon counterclockwise rotation of the pawl 108, the end 116 is freed from the ratchet wheel 106 with the end 114 then contacting the ratchet wheel 106 to once again lock the ratchet wheel 106 against further counterclockwise rotation. Since the ratchet wheel 106 has five teeth, upon each rocking movement of the pawl 108 about its axle 110, the lower roller 64 is allowed to rotate one fifth of a resolution.

A control rod 116 is rotatably mounted so as to extend across the width of the toy 20 within the interior of the housing 22 just behind the bottom of the screen 24. The control rod 116 includes a small cam 118 on its lowermost left hand side which is positioned to interact with the pawl 108 to rotate the pawl 108 about its axle. With each complete rotation of the control rod 116 as hereinafter described, the cam 118 will contact the pawl 108 and rock the pawl 108 about its axle 110 allowing for movement of the ratchet wheel 106 through one fifth of a degree rotation. As such, the lower roller 64 moves one fifth of a resolution for every complete rotation of the control rod 116.

The totality of the keys 36 are mounted on two key members 120 and 122. Together the keys 36 and the key members 120 and 122 comprise a first operator actuator which is ultimately associated with and interacts with the control rod 116. The reset button 32 is mounted on a space bar member 124 which comprises a second operator actuator which in turn is also associated with the control rod 116 and interacts with it. Each of the members 120, 122 and 124 is independently mounted on an axle 126 which extends across the interior of the housing 22 and is supported therein. This pivotally mounts the members 120, 122 and 124 beneath the keyboard 26 of the toy 20. Two small springs, only one of which can be seen, spring 128, attach to the respective members 120 and 122 to bias these members to rotate clockwise as seen in FIG. 3 which in turn bias the keys 36 upwardly such that they extend up and out of the keyboard 26. When the keys 36 are depressed, this rotates the members 120 and 122 about the axle 126, stretching the springs 128, and when the keys 36 are released, the spring 128 returns the keys 36 to an upward position.

A small slide member 130 is mounted to the interior of the housing 22 by fitting over a boss 132. The slide member 130 includes a contact arm 134 which extends upwardly and forwardly from the member 130. A small spring 136 extending between the slide member 130 and the interior of the housing 22 biases the slide member 130 downwardly. The slide member 130 contacts the end 138 of the reset member 124. The bias of the spring 136 pushes the end 138 downwardly such that the reset member 124 is rotated about the axle 126 to bias the reset button 34 upwardly.

A second slide member 140 is located next to the slide member 130. It is mounted about a boss 142 and includes a contact arm 144. A spring 146 biases the slide member 140 downwardly such that it contacts both end 148 of key member 120 and end 150 of key member 122. The spring 146 tends to urge the key members 120 and 122 both to rotate counterclockwise about the axle 126. However, it will be remembered that these are also independently biased by the small springs 128.

A ratchet wheel 152 is formed as a portion of the control rod 116. It has six teeth located thereon. However, as is evident from viewing FIG. 3, the position where a seventh tooth would be located is vacant. When any of the keys 36 are depressed, they will rotate one or the other of the key members 120 or 122 about the axle 126 such that one or the other of the respective ends 148 or 150 of these members contacts the slide member 140 to lift the slide member 140 upwardly. This moves the contact arm 144 upwardly. It is positioned so as to engage the ratchet wheel 152. Upon depression of any of the keys 36, the engagement of the contact arm 144 with the ratchet wheel 152 rotates the ratchet wheel 152 and the control rod 116 of which it is an integral part. The control rod 116 is rotated one seventh of a full revolution upon each engagement of the contact arm 144 with the ratchet wheel 152.

A second ratchet wheel 154 is also integrally formed with the control rod 116. This ratchet wheel, however, only includes one tooth. The one tooth is positioned so as to axially line up with the space wherein the tooth is missing on the ratchet wheel 152. The ratchet wheel 154 is positioned where it can be contacted by the contact arm 134 on the slide member 140. However, because there is only one tooth on the ratchet wheel 154, it will only be contacted by the contact arm 134 when that one tooth is positioned as is seen in FIG. 5. At this time, and at this time only, will depression of the reset button 34 be transmitted to the control rod 116 to rotate it.

Assuming the control rod 116 has just been rotated by depression of the reset button 34, the keys 36 can be depressed six times in a row, with each depression of the keys 36 resulting in movement of the contact arm 144 to contact the ratchet wheel 152 and rotate the same with rotation concurrently transmitted to the control rod 116. After the keys 36 have been depressed six times, the ratchet wheel 154 is now in position such that, upon depression of the reset button 34, the reset button 34 will cause rotation of the control rod 116. The cam 118 is positioned with respect to the tooth on the ratchet wheel 154 such that when the control rod 116 is rotated ultimately by the depression of the reset button 34 the cam 118 will interact with the pawl 108 to release the lower roller 64 allowing the bias of the coil spring 68 to move the paper roll 66 across the screen 24.

A further ratchet wheel 156 is located toward the left hand side of the control rod 116. This interacts with a small plastic spring arm 158 to make a clicking sound upon each incremental rotation of the control rod 116. Thus, independent of whether the control rod 116 is moved by the contact arm 134 or contact arm 144, a clicking noise will emanate upon rotation of the control rod 116.

The control rod 116 includes six additional cams, cams 160a through f. These cams ultimately control movement of the cover members 28a through f from their covered to their uncovered positions. The cams 160a through f are circumferentially spaced from each other around the circumference of the control rod 116. Six bell cranks, 162a through f are independently mounted about an axle 164 such that they can independently rotate about the axle 164. Each of the bell cranks 162 is positioned with respect to the control rod 116 such that one of the cams 160 will contact the lower arm of one of the bell crank 162 to rotate the bell crank 162 clockwise as seen in FIG. 3 about the axle 164. Each of the bell cranks 162 includes a small peg 166 which extends sideways out of its lower arm. Six springs, collectively identified by the numeral 168 extend forward from inside of the back of the housing 22 and are positioned underneath one of the pegs 166 on one of the bell cranks 162. This biases the bell cranks 162 counterclockwise about the axle 164.

The cams 160 as they move from left to right from cam 160a toward cam 160f are decreasingly smaller in size as measured arcuately or circumferentially around the cam. The control rod 116 is moved counterclockwise as viewed in the FIGS. The cams 160 are positioned circumferentially on the control rod 116 such that upon the first rotation of the control rod 116 by interaction of the contact arm 44 contacting the ratchet wheel 152 because of depression of the one of the keys 36, cam 160a will contact the bell crank 162a to rotate the bell crank 162a clockwise. Since the cam 160a has the greatest arcuate dimension, once the cam 160a contacts the bell crank 162a and rotates the bell crank 162a from the position seen in FIG. 3 to the position seen in FIG. 4, it holds the bell cranks 162a in this position until the ratchet wheel 154 is contacted by the control arm 134 as a result of the reset button 34. When this happens, the cam 160a moves clear of the bell crank 162a allowing it to be rotated counterclockwise under the influence of its spring 168 back to the position seen in FIG. 3.

Each of the cams 160 in reading from left to right, i.e., from cam 160a to cam 160f, in turn engage their respective bell crank 162 to rotate it counterclockwise from the position for bell crank 162a in FIG. 3 to the position for bell crank 162a in FIG. 4. Thus, first bell crank 162a is contacted and rotated clockwise and held there. Next bell crank 162b is contacted and rotated clockwise and held there. The remainder of the bell cranks are contracted and rotated in turn in a like manner.

The vertical arm of the bell cranks 162 include a forward projection 170. The projections 170 interact with the cover members 28. A plate 172 fits within the housing 22 just below the screen 24. The plate 172 has a plurality of holes collectively identified by the numeral 174. The forward projections 170 of each of the bell cranks 162 can fit into one of the holes 174. The cover members 28 are held between the plate 172 and the interior of the housing 22 just below the screen 24. They are free to slide up and down between these two structures. When raised to their covered position as hereinafter described, the bottom of the cover members 28 are lifted above one of the holes 174 such that the forward projection 170 on the respective bell crank 162 can slip beneath it as seen in FIG. 3 to hold the cover member 28 in the upward or covering position. When the bell cranks 162 are rotated clockwise as seen in FIG. 4, the forward projection 170 is pulled from beneath the respective cover member 28 out of the respective hole 174 allowing the cover member 28 to descend downwardly to the uncovered position as seen in FIG. 4. Because the bell cranks 162 are sequentially rotated from the position seen in FIG. 3 to the position seen in FIG. 4, the respective cover members 28a through f are sequentially moved from their covered to their uncovered position. This sequentially opens, from left to right, the bottommost portion of the screen 24 for viewing of the indicia located beneath the cover members 28.

The cover members 28 are simultaneously moved from their uncovered position upon depression of the reset button 34. A repositioning member 176 is pivotally mounted to the back of the inside of the housing 22. It includes two arms 178 and 180. Arm 180 is positioned so as to be contacted by extension 182 formed on the slide member 130. When the slide member 130 is moved upwardly upon depression of the reset button 34, the extension 182 contacts the arm 180 lifting it and the repositioning member 176 upwardly. The repositioning member 176 includes three lifting arms, collectively identified by the numeral 184. These are positioned so as to contact a small lifting tab collectively identified by the numeral 186 formed on each of the cover members 28.

The cams 160 are positioned on the control rod 116 such that they slip off of the ends of the bell cranks 162 when the control rod 116 is rotated via interaction of the extension 134 on the sliding member 130 with the ratchet wheel 150. Simultaneously, as the sliding member 130 is lifted, its extension 182 interacts with the repositioning member 176 and consequently the cover member 28 are lifted upwardly from the uncovered to the covered position in conjunction with repositioning of the bell cranks 162 in their counterclockwise position seen in FIG. 3. As soon as the respective cover members 28 clear the ends of the forward projection 170 on the respective bell cranks 162, the forward projection 170 of the bell cranks 162 can rotate inwardly through the holes 174 so as to become lodged underneath the bottom of the cover members 28 to hold them in the covered position.

FIG. 5 shows movement of the reset button downwardly with concurrent upward movement of the slide member 130 and lifting of the repositioning member 176 to lift the cover members 28. Just as the cover members 128 are lifted such that their bottom edge clears the holes 174 it can be seen that the cam 160 shown in phantom line clears the end of the bell crank 162, allowing it to rotate counterclockwise so as to hold the cover members 28 in their upward position.

I claim:
1. A toy which comprises:
a housing;
an indicia carrier means movably located on said housing, said indicia carrier means including indicia located thereon;
a viewing means located on said housing in association with said indicia carrier means, said indicia carrier means movable with respect to said viewing means, said viewing means permitting viewing a first portion of said indicia on said indicia carrier means and in response to movement of said indicia carrier means with respect to said viewing means said viewing means permitting viewing a further portion of said indicia on said indicia carrier means;
a plurality of cover members arranged in an array on said housing between said indicia carrier means and said viewing means, each of said cover members capable of moving one at a time in a predetermined fixed sequence between a covered position and an uncovered position, each of said cover members capable of covering a portion of said viewable indicia when in its respective covered position;
operator interface means operatively associated with both said plurality of indicia cover members and said indicia carrier means, said operator interface means operable by an operator of said toy in response to operation of said operator interface means each of said plurality of indicia cover members sequentially moving from their respective covered position to their respective uncovered position to sequentially uncover greater and greater portions of said viewable indicia on said indicia carrier means followed by said indicia carrier means moving to said further position and said plurality of indicia cover members moving to their respective covered positions.

2. The toy of claim 1 wherein:
said plurality of cover member are arranged in a linear array on said housing.

3. The toy of claim 1 wherein:
said indicia carrier means includes a carrier member movable located on said housing and movable with respect to said viewing means; said indicia located on said carrier member;
said viewing means for viewing at any one time only a portion of said indicia or said carrier member.

4. The toy of claim 3 wherein:
said carrier member comprises an elongated member having said indicia arranged in a linear array thereon, said carrier member linearly movable with respect to said viewing means.

5. The toy of claim 4 wherein:

said carrier means further includes roller means, said elongated member rollable on said roller means.

6. The toy of claim 5 wherein:
said elongated member comprises a flexible elongated member;
said roller means includes at least a first roller and a second roller, said flexible elongated member located on said first and second rollers so as to roll from one of said first and second rollers to the other of said first and second rollers.

7. The toy of claim 1 wherein:
said viewing means includes a viewing window located on said housing, said indicia carrier means located in association with said viewing window and movable with respect to said viewing window so as at any one time a portion of said indicia located on said carrier means is viewable through said viewing window.

8. The toy of claim 7 wherein:
said viewing means further includes screen means located in association with said viewing window, said viewable portion of said indicia viewable through said screen means.

9. The toy of claim 8 wherein:
said screen means comprises a lenticular screen.

10. The toy of claim 1 wherein:
said operator interface means includes at least two operator actuators, each of said operator actuator independently operable on by said operator of said toy.

11. A toy which comprises:
a housing;
an indicia carrier means movably located on said housing, said indicia carrier means including indicia located thereon;
a viewing means located on said housing in association with said indicia carrier means, said indicia carrier means movable with respect to said viewing means, said viewing means permitting viewing a first portion of said indicia on said indicia carrier means and in response to movement of said indicia carrier means with respect to said viewing means said viewing means permitting viewing a further portion of said indicia on said indicia carrier means;
an indicia cover means operatively associated with both of said viewing means and said indicia carrier means, said indicia carrier means movable between a covered position and an uncovered position, in said covered position said indicia cover means temporarily covering at least a portion of any of said viewable indicia inhibiting view thereof and in said uncovered position said indicia cover means uncovering said covered indicia allowing viewing thereof;
operator interface means operatively associated with both said plurality of indicia cover members and said indicia carrier means, said operator interface means operable by an operator interface means operatively associated with both said indicia cover means and said indicia carrier means, said operator interface means operable by an operator of said toy in response to operation of said operator interface means, said indicia cover means moving from said covered position to said uncovered position followed by said indicia carrier means moving to said further position and said indicia cover means moving to said covered position;
a first of said operator actuators being operatively associated with said indicia cover means so as to move said indicia cover means from said covered position to said uncovered position;
a second of said operator actuators being operatively associated with both said indicia cover means and said indicia carrier means so as to move said indicia cover means from said uncovered position to said covered position and move said indicia carrier means for viewing said first portion of said indicia and said further portion of said indicia on said indicia carrier means.

12. The toy of claim 11 including:
two of said first operator actuators each independently movable on said housing and each independently capable of moving said indicia cover means from said covered position to said uncovered position.

13. The toy of claim 11 including:
a control means, said control means having a plurality of control surfaces located thereon, a first of said control surfaces operatively associated with said indicia cover means, a second of said control surfaces operatively associated with said indicia carrier means, a third of said control surfaces operatively associated with said first operator actuator and a fourth of said control surfaces operatively associated with said second operator actuator, said control means movable mounted on said housing, said first and second operator actuators interacting with their respective control surfaces moving said control means and said movement of said control means transferred to said indicia cover means and said indicia carrier means by their respective control surfaces.

14. The toy of claim 11 wherein:
said indicia carrier means includes a carrier member movable located on said housing and movable with respect to said viewing means; said indicia located on said carrier member;
said viewing means for viewing at any one time only a portion of said indicia on said carrier member;
said viewing means includes a viewing window located on said housing, said indicia carrier means located in association with said viewing window and movable with respect to said viewing window so as at any one time a portion of said indicia located on said carrier means is viewable through said viewing window;
said operator interface means includes at least two operator actuators, each of said operator actuator independently operatable on by said operator of said toy.

15. A toy which comprises:
a housing;
an indicia carrier means movably located on said housing, said indicia carrier means including indicia located thereon;
a viewing means located on said housing in association with said indicia carrier means, said indicia carrier means movable with respect to said viewing means, said viewing means permitting viewing a first portion of said indicia on said indicia carrier means and in response to movement of said indicia carrier means with respect to said viewing means said viewing means permitting viewing a further portion of said indicia on said indicia carrier means;

an indicia cover means operatively associated with both of said viewing means and said indicia carrier means, said indicia carrier means movable between a covered position and an uncovered position, in said covered position said indicia cover means temporarily covering at least a portion of any of said viewable indicia inhibiting view thereof and in said uncovered position said indicia cover means uncovering said covered indicia allowing viewing thereof;

operator interface means operatively associated with both said indicia cover means and said indicia carrier means, said operator interface means operable by an operator of said toy in response to operation of said operator interface means, said indicia cover means moving from said covered position to said uncovered position followed by said indicia carrier means moving to said further position and said indicia cover means moving to said covered position;

a control means, said control means movably mounted on said housing so as to move on said housing, said operator interface means operatively associated with said control means so as to move said control means, said indicia cover means and said indicia carrier means operatively associated with said control means whereby movement of said control means is transferred to said indicia cover means and said indicia carrier means to move said indicia cover means between said covered and said uncovered positions and to move said indicia carrier means with respect to said viewing means for viewing said first portion of said indicia and said further portion of said indicia.

16. The toy of claim 15 wherein:

said control means is rotatably mounted on said housing so as to rotate on said housing;

said control means having a plurality of control surfaces located thereon, a first of said control surfaces operatively associated with said indicia cover means, a second of said control surfaces operatively associated with said indicia carrier means and a third of said control surfaces operatively associated with said operator interface means;

said operator interface means interacting with said third control surface to rotate said control means and rotation of said control means propagated to said indicia cover means and said indicia carrier means by said first and said second control surfaces respectively.

17. The toy of claim 15 wherein:

said indicia carrier means includes a carrier member movable located on said housing and movable with respect to said viewing means; said indicia located on said carrier member;

said viewing means for viewing at any one time only a portion of said indicia or said carrier member;

said carrier member comprises an elongated member having said indicia arranged in a linear array thereon, said carrier member linearly movable with respect to said viewing means;

said carrier means further includes roller means, said elongated member rollable on said roller means;

said elongated member comprises a flexible elongated member;

said roller means includes at least a first roller and a second roller, said flexible elongated member located on said first and second rollers so as to roll from one of said first and second rollers to the other of said first and second rollers;

said viewing means includes a viewing window located on said housing, said indicia carrier means located in association with said viewing window and movable with respect to said viewing window so as at any one time a portion of said indicia located on said carrier means is viewable through said viewing window;

said viewing means further includes screen means located in association with said viewing window, said viewable portion of said indicia viewable through said screen means;

said screen means comprises a lenticular screen.

* * * * *

UNITED STATES PATENT AND TRADEMARK OFFICE
CERTIFICATE OF CORRECTION

PATENT NO. : 4,573,928

DATED : MARCH 4, 1986

INVENTOR(S) : YOSHIZO SEKI

It is certified that error appears in the above-identified patent and that said Letters Patent is hereby corrected as shown below:

```
Column 2, line 60, "tHe" should be --the--.
Column 3, line 50, "22" should be --20--.
Column 5, line 10, "hold" should be --hole--.
Column 6, line 49, "108" should be --106--.
Column 6, line 59, "resolution" should be --revolution--.
Column 7, line 3, "resolution" should be --revolution--.
Column 8, line 66, "cranks" should be --crank--.
Column 9, line 12 and 13, "contracted" should be --contacted--.
Column 9, line 14, "arm" should be --arms--.
Column 9, line 64, "member" should be --members--.
Column 10, line 10, "128" should be --28--.
```

UNITED STATES PATENT AND TRADEMARK OFFICE
CERTIFICATE OF CORRECTION

PATENT NO. : 4,573,928

DATED : MARCH 4, 1986

INVENTOR(S) : YOSHIZO SEKI

It is certified that error appears in the above-identified patent and that said Letters Patent is hereby corrected as shown below:

```
     Column 10, line 54, "member" should be --members--.
     Column 10, line 58, "movable" should be --movably--.
     Column 10, line 62, "or" should be --on--.
     Column 11, lines 59-62, delete "interface means
operatively associated with both said indicia cover means
and said indicia carrier means, said operator interface
means operable by an operator".
     Column 11, line 62, after the word "toy" add the
word --and--.
     Column 12, line 39, "movable" should be --movably--.
        Column 13, line 14, after the word "toy" add
the word --and--.
     Column 14, line 11, "movable" should be --movably--.
     Column 14, line 16, "or" should be --on--.
```

Signed and Sealed this

Twenty-seventh Day of January, 1987

Attest:

DONALD J. QUIGG

Attesting Officer

Commissioner of Patents and Trademarks